United States Patent
Zeng et al.

(10) Patent No.: US 11,954,520 B2
(45) Date of Patent: Apr. 9, 2024

(54) MICRO KERNEL SCHEDULING METHOD AND APPARATUS

(71) Applicant: ALIBABA GROUP HOLDING LIMITED, George Town (KY)

(72) Inventors: Xu Zeng, Hangzhou (CN); Junjie Cai, Hangzhou (CN); Liangliang Zhu, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 173 days.

(21) Appl. No.: 16/725,880

(22) Filed: Dec. 23, 2019

(65) Prior Publication Data
US 2020/0133723 A1 Apr. 30, 2020

Related U.S. Application Data

(63) Continuation of application No. PCT/CN2018/091040, filed on Jun. 13, 2018.

(30) Foreign Application Priority Data

Jun. 26, 2017 (CN) .......................... 201710495861.5

(51) Int. Cl.
*G06F 9/48* (2006.01)
*G06F 9/30* (2018.01)
(Continued)

(52) U.S. Cl.
CPC ........ *G06F 9/4881* (2013.01); *G06F 9/30098* (2013.01); *G06F 9/45558* (2013.01);
(Continued)

(58) Field of Classification Search
CPC .... G06F 9/4881; G06F 9/45558; G06F 9/545; G06F 2009/45562
See application file for complete search history.

(56) References Cited

U.S. PATENT DOCUMENTS 8,448,022 B1 5/2013 Scott
10,496,439 B1* 12/2019 Dickson .................. G06F 9/455
(Continued)

FOREIGN PATENT DOCUMENTS

CN 1545041 11/2004
CN 1570855 1/2005
(Continued)

OTHER PUBLICATIONS

Unknown author (hereafter IntHandler) ("Combining setjmp()/longjmp() and Signal Handling", www.csl.mtu.edu/cs4411.ck/www/NOTES/non-local-goto/sig-1.html, Oct. 1, 2014) (Year: 2014).*
(Continued)

*Primary Examiner* — Lewis A Bullock, Jr.
*Assistant Examiner* — Kevin X Lu
(74) *Attorney, Agent, or Firm* — Finnegan, Henderson, Farabow, Garrett & Dunner, LLP

(57) ABSTRACT

A micro kernel scheduling method and apparatus are disclosed in embodiments of this disclosure. The method is applied to a software platform and includes: receiving a scheduling instruction for a current micro kernel; and switching the current micro kernel to a target micro kernel. In some embodiments, a micro kernel is switched directly according to a scheduling instruction, and this is completed without any thread of the software platform, which solves the problems in the conventional system of high micro kernel switching cost and poor real-time performance caused by one-to-one correspondence between micro kernels and threads of the software platform.

11 Claims, 5 Drawing Sheets

(51) Int. Cl.
G06F 9/455 (2018.01)
G06F 9/54 (2006.01)

(52) U.S. Cl.
CPC .... *G06F 9/545* (2013.01); *G06F 2009/45562* (2013.01); *G06F 2009/4557* (2013.01)

(56) References Cited

U.S. PATENT DOCUMENTS

| | | | |
|---|---|---|---|
| 10,846,117 B1* | 11/2020 | Steinberg | G06F 21/56 |
| 2002/0097717 A1 | 7/2002 | Vinsel | |
| 2007/0078891 A1* | 4/2007 | Lescouet | G06F 9/4881 |
| 2009/0055693 A1* | 2/2009 | Budko | G06F 9/45558 |
| | | | 718/1 |
| 2012/0284379 A1 | 11/2012 | Zievers | |
| 2013/0151849 A1* | 6/2013 | Graham | G06F 21/85 |
| | | | 713/164 |
| 2015/0220354 A1* | 8/2015 | Nair | G06F 9/45533 |
| | | | 710/308 |
| 2016/0147556 A1* | 5/2016 | Hu | G06F 9/45558 |
| | | | 718/1 |
| 2016/0378529 A1* | 12/2016 | Wen | G06F 9/45558 |
| | | | 718/1 |
| 2018/0074842 A1* | 3/2018 | Fu | G06F 9/542 |
| 2019/0044945 A1* | 2/2019 | Kundu | H04L 63/1408 |
| 2019/0370049 A1* | 12/2019 | Gopalan | G06F 9/45558 |
| 2021/0089647 A1* | 3/2021 | Suwad | G06F 21/552 |

FOREIGN PATENT DOCUMENTS

| | | |
|---|---|---|
| CN | 1922576 A | 2/2007 |
| CN | 101051282 | 10/2007 |
| CN | 101599039 | 12/2009 |
| CN | 101944063 | 1/2011 |
| CN | 102880933 A | 1/2013 |
| CN | 103136046 | 6/2013 |
| CN | 103927227 | 7/2014 |
| CN | 104123265 A | 10/2014 |
| CN | 105144100 | 12/2015 |
| CN | 106502164 | 3/2017 |
| JP | 2010205085 | 9/2010 |

OTHER PUBLICATIONS

Zhang et al. ("Performance analysis towards a KVM-based embedded real-time virtualization architecture", 5th Int'l Conf. on Comp. Sci. and Convergence Info. Tech., Nov. 1, 2010) (Year: 2010).*

Unknown Author, "CMU, class 15-213, Exceptional Control Flow", Oct. 24, 2000. (Year: 2000).*

W. Jiang et al., "CFS Optimizations to KVM Threads on Multi-Core Environment," 2009 15th International Conference on Parallel and Distributed Systems, Shenzhen, China, 2009, pp. 348-354, doi: 10.1109/ICPADS.2009.83. (Year: 2009).*

First Office Action issued by The State Intellectual Property Office of People's Republic of China in corresponding with Chinese Application No. 201710495861.5, dated Aug. 27, 2021 (15 pages).

Chinese Search Report in corresponding with Chinese Application No. 2017104958615, dated Aug. 10, 2021 (2 pages).

PCT International Search Report in corresponding with PCT Application No. PCT/CN2018/091040, dated Jan. 3, 2019 (5 pages).

PCT Written Opinion in corresponding with PCT Application No. PCT/CN2018/091040, dated Jan. 3, 2019 (6 pages).

Supplemental Search Report issued by the Chinese Patent Office, in corresponding with a Chinese Application No. 201710495861, dated Dec. 20, 2021. (1 page).

Supplemental Search Report issued by Chinese Patent Office in corresponding with the Chinese Application No. 2017104958615, dated Mar. 3, 2022. (1 page).

* cited by examiner

MICRO KERNEL SCHEDULING METHOD AND APPARATUS

This disclosure claims priority to International Application No. PCT/CN2018/091040, filed on Jun. 13, 2018, which claims priority to Chinese Patent Application No. 201710495861.5, filed on Jun. 26, 2017, all of which are incorporated herein by reference in their entireties.

BACKGROUND

With the rise of the Internet of Things (IoT), Micro Controller Unit (MCU) software applied to the IoT becomes increasingly complicated, and development and debugging for the MCU software are increasingly important. However, the conventional way of logging is no longer suitable for the current development of the IoT. On the other hand, some complex program debugging tools cannot be directly executed on an MCU due to limited resources of an MCU device. Therefore, running an IoT micro kernel on a Linux system and reusing development tools of the Linux system for software development and debugging can be appropriate.

SUMMARY

In view of the above problems, embodiments of this disclosure are proposed to provide an improved micro kernel scheduling method and a micro kernel scheduling apparatus.

In some embodiments, an exemplary micro kernel scheduling method applied to a software platform includes: receiving a scheduling instruction for a current micro kernel; and switching the current micro kernel to a target micro kernel.

In some embodiments, an exemplary micro kernel scheduling apparatus applied to a software platform includes a memory storing a set of instructions and at least one processor configured to execute the set of instructions to cause the apparatus to perform: receiving a scheduling instruction for a current micro kernel, and switching the current micro kernel to a target micro kernel.

In some embodiments, a non-transitory computer-readable storage medium can store a set of instructions that is executable by one or more processing devices to cause a computer to perform a method comprising: receiving a scheduling instruction for a current micro kernel; and switching the current micro kernel to a target micro kernel.

DETAILED DESCRIPTION

This disclosure is described in further detail below with reference to the accompanying drawings and specific implementation manners to enable the above objectives, features and advantages of this disclosure to be more comprehensible.

In conventional systems, when micro kernels are executed in a Linux system, each micro kernel corresponds to a Linux thread, scheduling of the micro kernels and scheduling of the Linux threads are mixed together, and switching between the micro kernels is controlled by the Linux system uniformly, thus having a high switching cost and poor real-time performance. Accordingly, due to the one-to-one correspondence between micro kernels and threads of the software platform, conventional methods for micro kernel scheduling have a high switching cost and poor real-time performance.

The embodiments of this disclosure can bring many improvements over conventional methods. For example, in some embodiments of this disclosure, a scheduling instruction for a current micro kernel is received, and the current micro kernel can be switched to a target micro kernel, so that software running can be simulated with the target micro kernel. A micro kernel can be switched directly according to a scheduling instruction, and this can be completed without any thread of a software platform.

In some embodiments of this disclosure, the micro kernel can be scheduled directly using a setjmp/longjmp function, ensuring that the switching process is independent of any Linux thread. Moreover, the micro kernel is separated from the software platform, so that the micro kernel can independently complete stack initialization and memory allocation processes at a kernel processing stage. Thus, a memory leakage tool, such as valgrid (a software development tool for memory debugging, memory leakage detection and performance analysis) can be used to detect whether memory leakage occurs, thereby positioning the location of a failure in time and improving the efficiency of software development and debugging. Additionally, a newlib library can be further provided to replace a glibc library of a Linux platform to separate the micro kernel from the Linux platform. The software can directly call each interface in the newlib library in the running process, thus further cutting off a connection between the micro kernel and a thread of the Linux platform.

In some embodiments of this disclosure, the micro kernel is running on the software platform, so that the micro kernel may not be limited by the resources of the MCU device when software running is simulated, and the software running can be simulated with existing resources, thus improving the efficiency of software running simulation.

In some embodiments of this disclosure, an agent thread or agent process can also be used to forward Linux event messages to simulate a network card or an external device.

Figure 1:
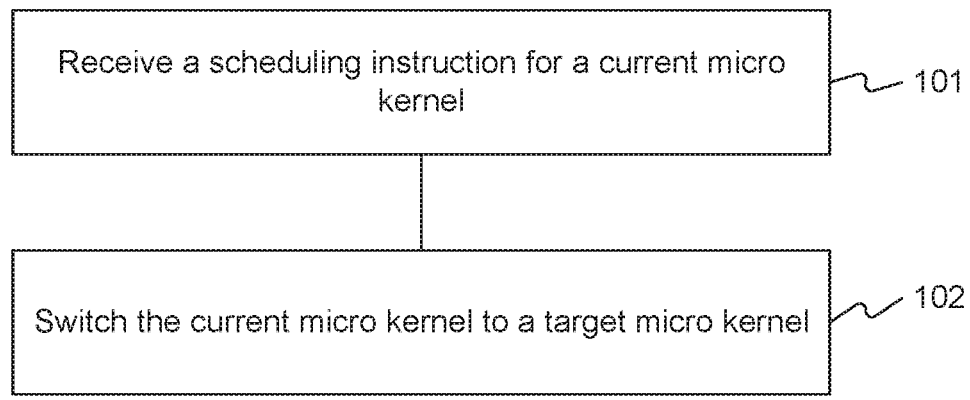
FIG. 1 is a flowchart of an exemplary micro kernel scheduling method according to some embodiments of this disclosure.

Referring to FIG. 1, a flowchart of an exemplary micro kernel scheduling method 100 according to some embodiments of this disclosure is shown. The method 100 can be applied to a software platform. In some embodiments of this disclosure, the software platform can be a Linux platform. The Linux is a Unix-like operating system for free use and free dissemination and is a Posix- and Unix-based multi-user and multi-task operating system that supports multiple threads and multiple CPUs. It can run main Unix tool software, applications, and network protocols, and support 32-bit and 64-bit hardware. The Linux inherits the design idea of the Unix that the network is taken as a core and can be installed in all kinds of computer hardware devices as a multi-user network operating system with stable performance. Therefore, the Linux platform can refer to a computer device installed with a Linux operating system, for example, a mobile phone, a tablet computer, a router, a video game console, a desk-top computer, a main-frame computer, a supercomputer, and so on. For ease of understanding, some embodiments are described by taking a Linux platform as an example.

In step 101, a scheduling instruction for a current micro kernel is received. In some embodiments of this disclosure, a host thread or a Kernel-based Virtual Machine (KVM) can be executed on the Linux platform, and the micro kernel can be executed in the host thread or the KVM. The KVM is a full-featured virtualization solution on an x86 hardware platform of the Linux, includes a loadable kernel module, and is capable of providing and virtualizing core architecture and processor specifications. A micro kernel is a simplified version of a kernel that provides core functions of an operating system. It is typically designed to increase portability in a small memory space, provide a modular design, and allow a user to install different interfaces such as DOS, Workplace OS, and Workplace Unix. The micro kernel can provide necessary services of the operating system, including tasks, threads, Inter-Process Communication (IPC), memory management, and so on.

In some embodiments of this disclosure, the micro kernel may be a simplified version of a kernel of a Real Time Operating System (RTOS). The RTOS refers to an operating system that can accept and process an external event or data fast enough when it is generated. The RTOS can also control a production process or make quick response to the processing system within a specified time according to its processing result, schedule all available resources to complete real-time tasks, and control all the real-time tasks to run in harmony. The RTOS is mainly featured with the capability of providing timely response and high reliability.

In order to simulate the running of the micro kernel on the Linux platform, the switching or scheduling of the micro kernel can be independent of a Linux thread. For example, the micro kernel can be switched or scheduled without using a Linux thread.

In some embodiments of this disclosure, an external device can input a corresponding scheduling instruction for the micro kernel to directly act upon the micro kernel, so that the micro kernel can execute the scheduling instruction after receiving the scheduling instruction, for directly switching the micro kernel.

In some embodiments of this disclosure, the scheduling instruction can include an instruction for a setjmp function and a longjmp function. A user can input a scheduling instruction through an external device connected to the Linux platform, such as a keyboard, and call the setjmp function and the longjmp function according to the scheduling instruction, thus realizing the switching between micro kernels and ensuring that the switching process is independent of any Linux thread.

Setjmp and longjmp are both computer statements and belong to a C function library, and they can function as a non-local label and goto, respectively. It should be noted that when setjmp and longjmp are used in combination, they are executed in a strict sequence: the setjmp function is called first, and the longjmp function is called later to restore to a previously stored "program execution point." Otherwise, if the longjmp function is executed before the setjmp function is called, the execution stream of the program will be unpredictable, which may easily cause the program to crash and exit. Secondly, longjmp has to be within a scope of setjmp. Specifically, setjmp is used in a function to initialize a global label, and then the program can jump anywhere else to the next statement of setjmp for execution by calling longjmp, as long as the function has not returned.

In step 102, the current micro kernel is switched to a target micro kernel. Generally, each micro kernel has a corresponding micro kernel control unit, and each micro kernel control unit has a corresponding control value. In some embodiments of this disclosure, the micro kernel control unit can be a CPU register, and correspondingly, the control value in the micro kernel control unit can be a register value. For ease of understanding, some embodiments are introduced by taking that the micro kernel control unit is a CPU register and the control value is a register value as an example. The CPU register, as a component of a CPU, is a high-speed storage unit with a limited storage capacity, and can be used to temporarily store instructions, data, and addresses. Typically, the switching between micro kernels is the switching between CPU registers corresponding to the micro kernels.

Therefore, in some embodiments of this disclosure, the switching of the CPU register can be directly controlled by the setjmp function and the longjmp function to bypass the Linux thread and directly schedule the micro kernel.

In a specific implementation, a first control value corresponding to the target micro kernel can be determined at first according to the scheduling instruction, and then a second control value corresponding to the current micro kernel is replaced with the first control value corresponding to the target micro kernel.

In some embodiments of this disclosure, after the current micro kernel is switched to the target micro kernel, software running can be simulated with the target micro kernel. Generally, the micro kernel is connected to a software stack, and all software in the software stack can run in a micro kernel environment. In a specific implementation, after the current micro kernel is switched to a target micro kernel, running of corresponding software can be simulated with the target micro kernel.

In some embodiments of this disclosure, a newlib library can be further provided to replace a glibc library of the Linux platform in order to separate the micro kernel from the software platform. Thus, the software can directly call various interfaces in the newlib library in the running process.

The newlib library and the glibc library are both C standard libraries. The C standard library is a set of C built-in functions, constants, and header files, such as <stdio.h>, <stdlib.h>, and <math.h>. The newlib library and the glibc library have a corresponding binding relation with the micro kernel and the Linux platform, respectively. In other words, the newlib library is applied to the micro kernel, while the glibc library is applied to the Linux platform.

In some embodiments of this disclosure, a scheduling instruction for a current micro kernel is received, and the current micro kernel is switched to a target micro kernel, so that software running can be simulated with the target micro kernel. In some embodiments, a micro kernel is switched directly according to a scheduling instruction, and the above process is completed without any thread of a software platform. This can solve the problems in conventional systems of high micro kernel switching cost and poor real-time performance caused by one-to-one correspondence between micro kernels and threads of the software platform.

Secondly, in some embodiments of this disclosure, the micro kernel can be scheduled directly using a setjmp/longjmp function, ensuring that the switching process is independent of any Linux thread. Moreover, the micro kernel is separated from the software platform, so that the micro kernel can independently complete stack initialization and memory allocation processes at a kernel processing stage. Thus, a memory leakage tool, such as valgrid (a software development tool for memory debugging, memory leakage detection and performance analysis), can be used to detect whether memory leakage occurs, thereby positioning the location of a failure in time and improving the efficiency of software development and debugging. Additionally, in some embodiments of this disclosure, a newlib library can be further provided to replace a glibc library of a Linux platform in order to separate the micro kernel from the Linux platform. The software can directly call each interface in the newlib library in the running process, thus further cutting off a connection between the micro kernel and a thread of the Linux platform.

Thirdly, in some embodiments, the micro kernel can be executed on the software platform, so that the micro kernel may not be limited by the resources of the MCU device when software running is simulated, and the software running can be simulated with existing resources, thus improving the efficiency software running simulation.

Figure 2:
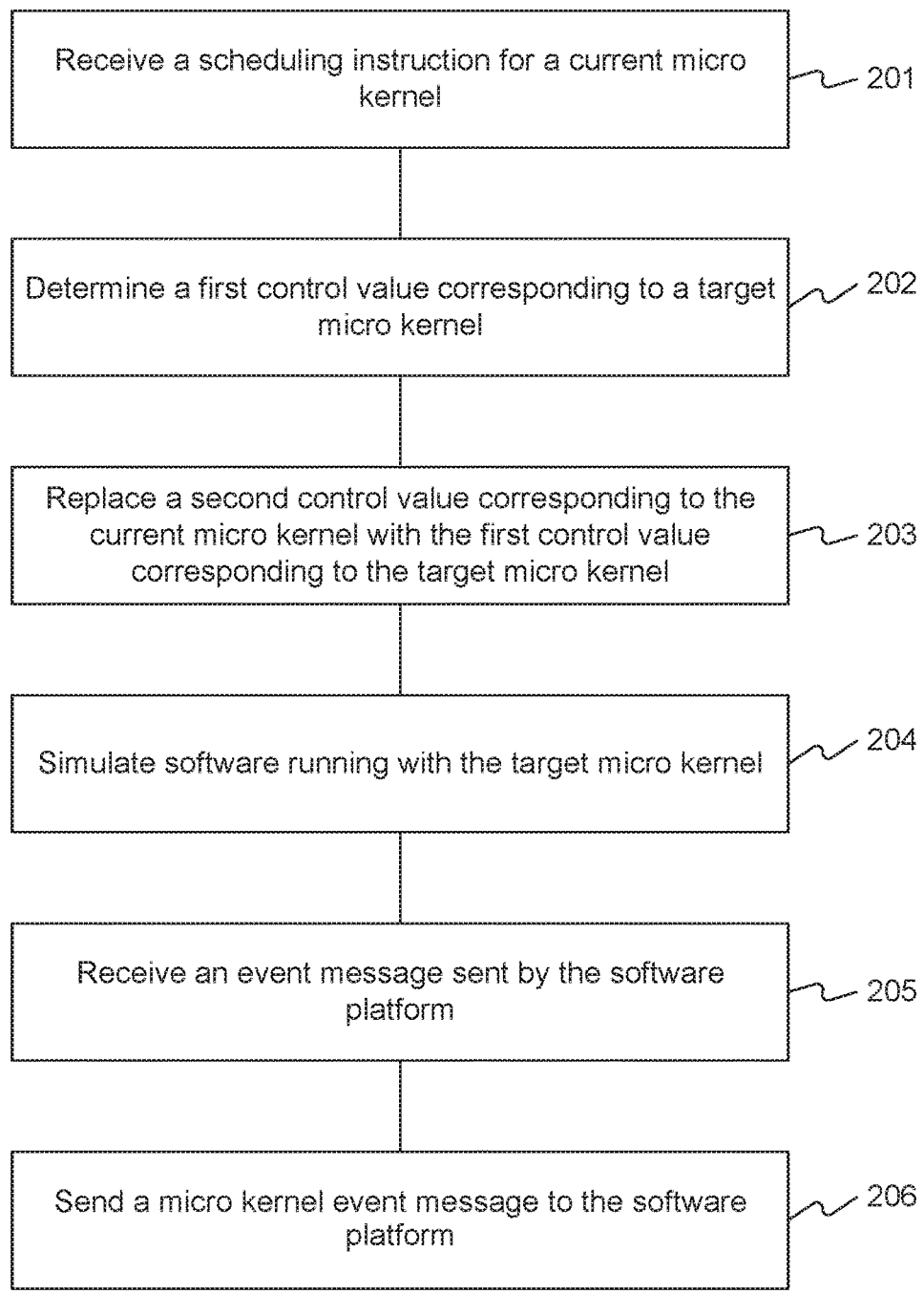
FIG. 2 is a flowchart of an exemplary micro kernel scheduling method according to some embodiments of this disclosure.

Referring to FIG. 2, a flowchart of an exemplary micro kernel scheduling method 200 according to some embodiments of this disclosure is shown. The method 200 can be applied to a software platform. For ease of understanding, some embodiments are introduced by taking a Linux platform as an example.

In step 201, a scheduling instruction for a current micro kernel is received. In some embodiments of this disclosure, a host thread or a KVM can be executed on the Linux platform, and the micro kernel can be executed in the host thread or the KVM.

In some embodiments of this disclosure, the scheduling instruction for the current micro kernel can include an instruction for a setjmp function and a longjmp function. Setjmp and longjmp are both a computer statements and belong to a C function library, which function as a non-local label and goto, respectively.

In a specific implementation, the Linux platform can be connected to an external device, such as a keyboard. The user can input a scheduling instruction through the external device and call the setjmp function and the longjmp function according to the scheduling instruction.

It should be noted that when setjmp and longjmp are used in combination, they are executed in a strict sequence: the setjmp function is called first, and the longjmp function is called later.

In step 202, a first control value corresponding to a target micro kernel is determined. Typically, the switching between micro kernels is the switching between micro kernel control units corresponding to the micro kernels. Therefore, when the micro kernel is switched, a first control value corresponding to the target micro kernel to which the micro kernel is to be switched can be determined at first. The first control value is the control value corresponding to the micro kernel control unit corresponding to the target micro kernel.

In step 203, a second control value corresponding to the current micro kernel is replaced with the first control value corresponding to the target micro kernel. The second control value corresponding to the current micro kernel is the control value corresponding to the micro kernel control unit corresponding to the current micro kernel. In a specific implementation, the second control value in the micro kernel control unit can be modified to the first control value corresponding to the target micro kernel, thus completing the switching between the micro kernels. For ease of understanding, some embodiments are introduced by taking that the micro kernel control unit is a CPU register and the control value is a register value as an example.

Therefore, in a specific implementation, a first register value corresponding to the target micro kernel can be determined at first, and then a second register value corresponding to the current micro kernel is replaced with the first register value corresponding to the target micro kernel.

In some embodiments of this disclosure, the setjmp function and the longjmp function directly act on the switching of the CPU registers corresponding to the micro kernels, so that the switching between the micro kernels is independent of a Linux thread and does not require the scheduling of any Linux thread, thus reducing the cost of the switching between the micro kernels and improving the real-time performance.

In step 204, software running is simulated with the target micro kernel. In some embodiments of this disclosure, the micro kernel is connected to a software stack, and all software in the software stack can run in a micro kernel environment. Therefore, after the current micro kernel is switched to a target micro kernel, running of corresponding software can be simulated with the target micro kernel.

In step 205, an event message sent by the software platform is received. In some embodiments of this disclosure, the micro kernel is run independently on the Linux platform. However, the micro kernel can also communicate with the Linux platform. For example, it receives an event message sent by the Linux platform, e.g., a Linux event message.

It should be noted that there is no direct communication between the micro kernel and the software platform, and the communication needs to be relayed by another thread or device, such as an agent thread or agent process. The agent thread or agent process can be a thread or process in an Agent World. The Agent World can simulate an external device such as a network card, a virtual network card, or other external devices.

In a specific implementation, the software platform can send an event message to the agent thread or agent process, the agent thread or agent process forwards the event message to the host thread, and then the host thread can convert the event message to an interrupt event. The micro kernel can receive the above interrupt event sent by the host thread to understand related information about the software platform.

In some embodiments of this disclosure, the host thread can convert the received event message to an interrupt event by a signal( ) function. The prototype of the signal( ) function can be expressed as:

void(*signal(int signum,void(*handler)(int)))(int)

The signal( ) function can set a handler function of a signal according to the serial number of the signal designated by the parameter signum. When the designated signal arrives, a function designated by the parameter handler can be redirected to for execution. When a signal handler function of a signal is being executed, if the process receives the signal again, the signal can be automatically stored without interrupting the execution of the signal handler function, and the corresponding handler function will not be called until the signal handler function is completely executed. However, if the process receives a signal of another type while the signal handler function is being executed, the execution of the function can be interrupted, thus forming an interrupt event.

As an example of this disclosure, when the micro kernel is executed on the Linux platform, a function of simulating peripherals can also be implemented, e.g., the Linux event message can be generated from information input by an external device. For example, when a user inputs information on an external device (such as a keyboard) connected to the Linux platform, the Linux platform can receive the information input by the external device, and the Linux platform can convert the information to a Linux event message and send the Linux event message to the agent thread or agent process. The agent thread or agent process forwards the Linux event message to the host thread, and thus after the host thread converts the Linux event message to an interrupt event, the micro kernel can receive the interrupt event.

In some embodiments of this disclosure, the agent thread or agent process can have a corresponding entity which can be a network card or virtual network card. For example, the corresponding functions of the agent thread or agent process are implemented through the network card or virtual network card.

When the functions of the agent thread or agent process are implemented through the network card or virtual network card, the Linux event message received by the micro kernel can be network data of the Linux platform. The network data can be transmitted to a network protocol stack of the micro kernel to achieve a function of simulating the network protocol stack.

Certainly, those skilled in the art can also select other communication means such as blocking calls to realize the communication between the micro kernel and the Linux platform, which is not limited in some embodiments of this disclosure.

In step 206, a micro kernel event message is sent to the software platform. In some embodiments of this disclosure, the micro kernel not only can receive the event messages sent by the software platform, but also can send its own micro kernel event message to the software platform. In a specific implementation, the micro kernel can send a micro kernel event message to the agent thread or agent process, and then the agent thread or agent process can forward the micro kernel event message to the software platform, so that the software platform can timely understand the information in the micro kernel.

For ease of understanding, the micro kernel scheduling method in this disclosure is introduced below with a specific example.

Figure 3:
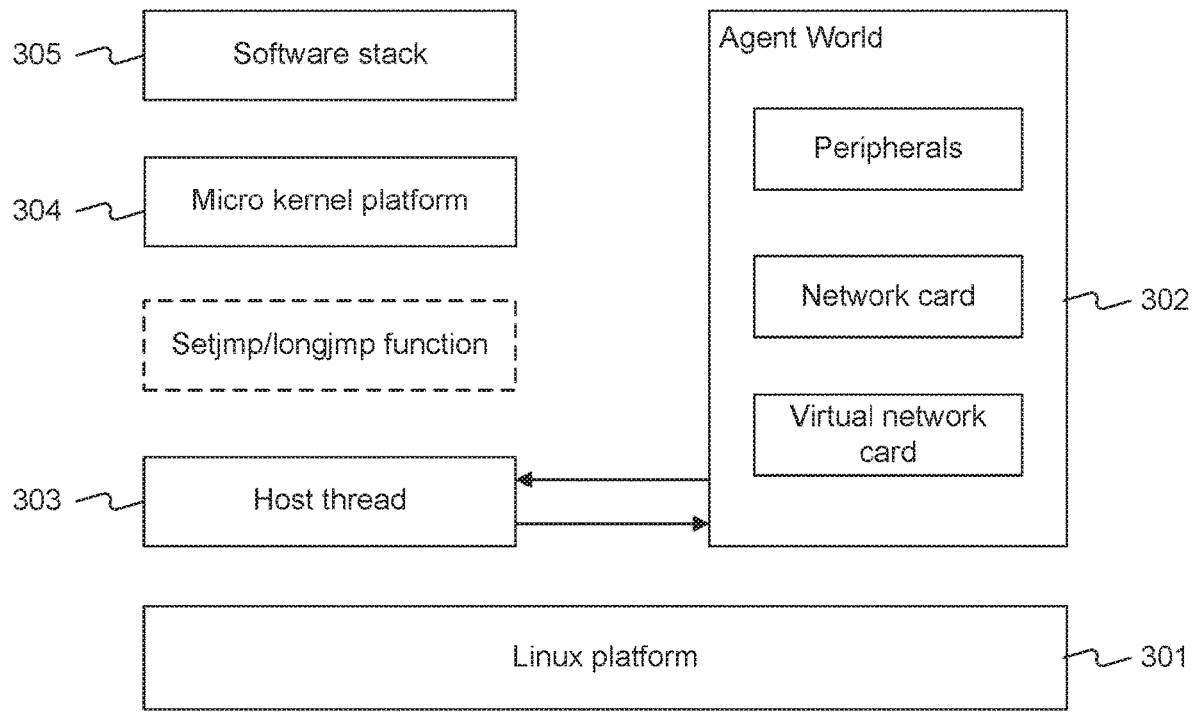
FIG. 3 is a schematic diagram of an exemplary micro kernel scheduling according to some embodiments of this disclosure.

Referring to FIG. 3, a schematic diagram of an exemplary micro kernel scheduling 300, according to some embodiments of this disclosure is shown. The software platform is a Linux platform. In FIG. 3, an Agent World 302 and a Host Thread 303 can be executed on a Linux platform 301. The Agent World 302 can realize simulation for a network protocol stack and simulation for an external device to provide an agent thread or agent process. A micro kernel platform 304 can be executed in the Host Thread 303. The micro kernel platform 304 includes a plurality of micro kernels and is further connected to a software stack 305. The software stack 305 includes a plurality of software, each of which is executed in a corresponding micro kernel environment.

In one aspect, the user can input a scheduling instruction through an external device to call a setjmp function and a longjmp function, and control the switching of a particular value in a micro kernel control unit (e.g., a CPU register) corresponding to a micro kernel, thus realizing the switching between micro kernels. The above switching process directly acts on the micro kernel control units corresponding to the micro kernels without the scheduling of a Linux thread, and therefore, the switching between the micro kernels is independent of the Linux thread. This can reduce the cost of the switching between the micro kernels, and improve the real-time performance. After the switching between the micro kernels is completed, a target micro kernel after the switching can be used by corresponding software in the software stack, so that the software can execute in the environment of the target micro kernel.

In another aspect, the micro kernel can also communicate with the Linux platform. For example, the micro kernel applies for a clock from the Linux platform. The micro kernel can consider the application information as a micro kernel event message and send the micro kernel event message to an agent thread or agent process (a thread or process in the Agent World) through the host thread. The agent thread or agent process forwards the micro kernel event message to the Linux platform. At the same time, after receiving the above message, the Linux platform can send a response message in the form of a Linux event message to the agent thread or agent process, and the agent thread or agent process can forward the Linux event message to the host thread. After the host thread converts the received Linux event message to an interrupt event, the micro kernel can receive the above interrupt event in time, thus completing the communication between the micro kernel and the Linux platform.

It should be noted that for ease of description, the method embodiments can all be described as a series of actions. However, those skilled in the art should know that some embodiments of this disclosure are not limited to the described sequence of the actions, because some steps can be performed in another sequence or at the same time according to some embodiments of this disclosure. In addition, those skilled in the art should also know that some embodiments described in this specification all belong to preferred embodiments, and the actions involved are not necessarily mandatory to some embodiments of this disclosure.

Figure 4:
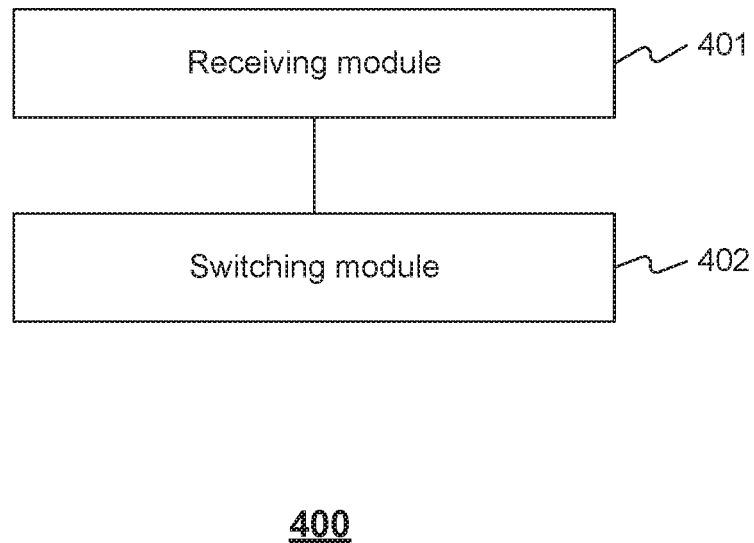
FIG. 4 is a structural block diagram of an exemplary micro kernel scheduling apparatus according to some embodiments of this disclosure.

Referring to FIG. 4, a structural block diagram of an exemplary micro kernel scheduling apparatus 400, according to some embodiments of this disclosure is shown. The apparatus 400 can be applied to a software platform, and can specifically include a receiving module 401 configured to receive a scheduling instruction for a current micro kernel and a switching module 402 configured to switch the current micro kernel to a target micro kernel.

In some embodiments of this disclosure, a host thread or a Kernel-based Virtual Machine KVM can be executed on the software platform, and the micro kernel can be executed in the host thread or the KVM.

In some embodiments of this disclosure, each micro kernel can have a corresponding micro kernel control unit, and each micro kernel control unit can have a corresponding control value. Switching module 402 can specifically include a determining submodule configured to determine a first control value corresponding to the target micro kernel and a replacing submodule configured to replace a second control value corresponding to the current micro kernel with the first control value corresponding to the target micro kernel.

In some embodiments of this disclosure, the scheduling instruction can include an instruction for a setjmp function and a longjmp function. In some embodiments of this disclosure, the receiving module 401 can specifically include a receiving submodule configured to receive a scheduling instruction input by an external device and a calling submodule configured to call the setjmp function and the longjmp function according to the scheduling instruction.

In some embodiments of this disclosure, the apparatus can further include an event message receiving module configured to receive an event message sent by the software platform.

In some embodiments of this disclosure, the apparatus can include a simulating module configured to simulate software running with the target micro kernel.

In some embodiments of this disclosure, a host thread and an agent thread or agent process can be executed on the software platform, and the event message receiving module can specifically include an event message sending submodule configured to send, by the software platform, the event message to the agent thread or agent process, an event message forwarding submodule configured to forward, by the agent thread or agent process, the event message to the host thread, a converting submodule configured to convert, by the host thread, the event message to an interrupt event, and an interrupt event receiving submodule configured to receive the interrupt event sent by the host thread.

In some embodiments of this disclosure, the event message sending submodule can specifically include a receiving unit configured to receive, by the software platform, information input by an external device, and a converting unit configured to convert, by the software platform, the information to an event message and send the event message to the agent thread or agent process.

In some embodiments of this disclosure, the apparatus can further include a micro kernel event message sending module configured to send a micro kernel event message to the software platform. In some embodiments of this disclosure, the micro kernel event message sending module can specifically include a micro kernel event message sending submodule configured to send the micro kernel event message to the agent thread or agent process, and a micro kernel event message forwarding submodule configured to forward, by the agent thread or agent process, the micro kernel event message to the software platform.

In some embodiments of this disclosure, the software platform can be a Linux platform. The micro kernel control unit can be a CPU register, and the control value can be a register value.

In some embodiments of this disclosure, the agent thread or agent process can have a corresponding entity which can be a network card or virtual network card.

The apparatus embodiment is basically similar to the method embodiment and thus is described simply. Related parts can be obtained with reference to the descriptions of the parts in the method embodiment.

Figure 5:
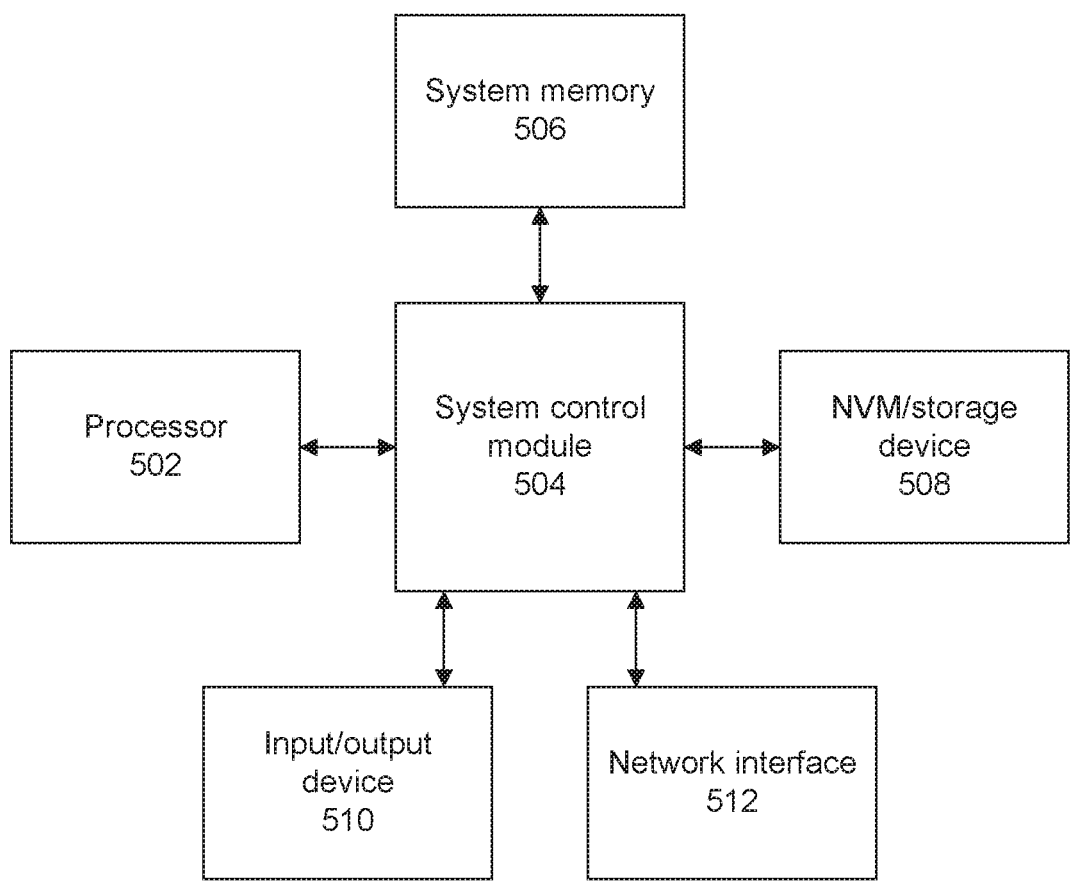
FIG. 5 illustrates a schematic diagram of an exemplary system, according to some embodiments of the disclosure

Some embodiments of this disclosure can be implemented as a system for performing a desired configuration using any suitable hardware, firmware, software, or any combination thereof. FIG. 5 illustrates a schematic diagram of an exemplary system 500, according to some embodiments of the disclosure.

System 500 can include one or more processors 502, a system control module (e.g., a chipset) 504 coupled to the one or more processors 502, a system memory 506 coupled to the system control module 504, a non-volatile memory (NVM)/storage device 508 coupled to the system control module 504, one or more input/output devices 510 coupled to the system control module 504, and a network interface 512 coupled to the system control module 504.

Processor 502 can include one or more single-core or multi-core processors, and processor 502 can include any combination of general-purpose or special-purpose processors (such as a graphics processor, an application processor, an NPU accelerator, and a baseband processor). In some embodiments, system 500 can function as a browser as described in embodiments of the disclosure.

In some embodiments, system 500 can include and be integrated with one or more computer readable media (e.g., system memory 506 or NVM/storage device 508) having instructions, and can be configured to execute the instructions to implement one or more processors 502 that perform the actions described in this disclosure.

As an example, system control module 504 can include any suitable interface controller to provide any suitable interface to the one or more processors 502 or any suitable device or component in communication with system control module 504.

System control module 504 can include a memory controller module to provide an interface to system memory 506. The memory controller module 504 can be a hardware module, a software module, and/or a firmware module.

System memory 506 can be configured to, for example, load and store data or instructions for system 500. For one embodiment, system memory 506 can include any suitable volatile memory, such as a suitable DRAM. In some embodiments, the system memory 506 can include a double-data-rate type quad synchronous dynamic random access memory (DDR5SDRAM).

For some embodiments, system control module 504 can include one or more input/output controllers to provide an interface to NVM/storage device 508 and one or more input/output devices 510.

For example, NVM/storage device 508 can be configured to store data and/or instructions. NVM/storage device 508 can include any suitable non-volatile memory (such as a flash memory) or can include any suitable (one or more) non-volatile storage devices (such as one or more hard disk drives (HDDs), one or more compact disc (CD) drives and/or one or more digital versatile disc (DVD) drives).

NVM/storage device 508 can include storage resources that are physically part of the device on which system 500 is installed, or that can be accessed by the device without having to be part of the device. For example, NVM/storage device 508 can be accessed over the network via one or more input/output devices 510.

One or more input/output devices 510 can provide an interface to system 500 to communicate with any other suitable device, and input/output device 510 can include a communication component, an audio component, a sensor component, and the like. Network interface 512 can provide an interface for system 500 to communicate over one or more networks, and system 500 can communicate with one or more of the wireless networks wirelessly in accordance with any of the one or more wireless network standards and/or protocols, e.g., by accessing a wireless network based on a communication standard, such as WiFi, 2G or 3G, or a combination thereof.

As an example, at least one of one or more processors 502 can be packaged with logic of one or more controllers (e.g., the memory controller module) of system control module 504. For one embodiment, at least one of one or more processors 502 can be packaged with the logic of one or more controllers of system control module 504 to form a system in package (SiP). For some embodiments, at least one of one or more processors 502 can be integrated with the logic of one or more controllers of the system control module 504 on the same mold. For some embodiments, at least one of one or more processors 502 can be integrated with the logic of one or more controllers of system control module 504 on the same mold to form a system on chip (SoC).

In various embodiments, system 500 can be, but is not limited to, a browser, a workstation, a desktop computing device, or a mobile computing device (such as a laptop computing device, a handheld computing device, a tablet, and a netbook). In various embodiments, system 500 may have more or fewer components and/or different architectures. For example, in some embodiments, system 500 includes one or more cameras, a keyboard, a liquid crystal display (LCD) screen (including a touch screen display), a non-volatile memory port, a plurality of antennas, a graphics chip, an application specific integrated circuit (ASIC), and a speaker.

If the display includes a touch panel, the display screen can be implemented as a touch screen display to receive an input signal from a user. The touch panel includes one or more touch sensors to sense touches, slides, and gestures on the touch panel. The touch sensors not only can sense boundaries of a touching or sliding movement, but also can detect duration and pressure associated with the touching or sliding operation.

The embodiments may further be described using the following clauses:

1. A micro kernel scheduling method, applied to a software platform, the method comprising:
   receiving a scheduling instruction for a current micro kernel; and
   switching the current micro kernel to a target micro kernel.
2. The method of clause 1, wherein a host thread or a Kernel-based Virtual Machine (KVM) is executed on the software platform, and the micro kernel is executed in the host thread or the KVM.
3. The method of clause 1, wherein each micro kernel has a corresponding micro kernel control unit, each micro kernel control unit has a corresponding control value, and switching the current micro kernel to the target micro kernel comprises:
   determining a first control value corresponding to the target micro kernel; and
   replacing a second control value corresponding to the current micro kernel with the first control value corresponding to the target micro kernel.
4. The method of clause 1 or 2 or 3, wherein the scheduling instruction comprises an instruction for a setjmp function and a longjmp function.
5. The method of clause 4, wherein receiving the scheduling instruction for the current micro kernel comprises:
   receiving a scheduling instruction input by an external device; and
   calling the setjmp function and the longjmp function according to the scheduling instruction.
6. The method of clause 1, further comprising:
   simulating software running with the target micro kernel.
7. The method of clause 1, further comprising:
   receiving an event message sent by the software platform.
8. The method of clause 7, wherein a host thread and one of an agent thread or agent process are executed on the software platform, and receiving the event message sent by the software platform comprises:
   sending, by the software platform, the event message to the agent thread or agent process;
   forwarding, by the agent thread or agent process, the event message to the host thread;
   converting, by the host thread, the event message to an interrupt event; and
   receiving the interrupt event sent by the host thread.
9. The method of clause 8, wherein sending, by the software platform, the event message to the agent thread or agent process comprises:
   receiving, by the software platform, information input by an external device;
   converting, by the software platform, the information to an event message; and
   sending, by the software platform, the event message to the agent thread or agent process.
10. The method of clause 7 or 8 or 9, further comprising:
    sending a micro kernel event message to the software platform.
11. The method of clause 10, wherein sending the micro kernel event message to the software platform comprises:
    sending the micro kernel event message to the agent thread or agent process; and
    forwarding, by the agent thread or agent process, the micro kernel event message to the software platform.
12. The method of clause 1, wherein the software platform is a Linux platform.
13. The method of clause 3, wherein the micro kernel control unit is a CPU register, and the control value is a register value.
14. The method of clause 8, wherein the agent thread or agent process has a corresponding entity that comprises a network card or virtual network card.
15. A micro kernel scheduling apparatus, applied to a software platform, the apparatus comprising:
    a receiving module configured to receive a scheduling instruction for a current micro kernel; and
    a switching module configured to switch the current micro kernel to a target micro kernel.
16. The apparatus of clause 15, wherein a host thread or a Kernel-based Virtual Machine (KVM) is executed on the software platform, and the micro kernel is executed in the host thread or the KVM.
17. The apparatus of clause 15, wherein each micro kernel has a corresponding micro kernel control unit, each micro kernel control unit has a corresponding control value, and the switching module comprises:
    a determining submodule configured to determine a first control value corresponding to the target micro kernel; and
    a replacing submodule configured to replace a second control value corresponding to the current micro kernel with the first control value corresponding to the target micro kernel.
18. The apparatus of clause 15 or 16 or 17, wherein the scheduling instruction comprises an instruction for a setjmp function and a longjmp function.
19. The apparatus of clause 18, wherein the receiving module comprises:
    a receiving submodule configured to receive a scheduling instruction input by an external device; and
    a calling submodule configured to call the setjmp function and the longjmp function according to the scheduling instruction.
20. The apparatus of clause 15, further comprising:
    a simulating module configured to simulate software running with the target micro kernel.
21. The apparatus of clause 15, further comprising:
    an event message receiving module configured to receive an event message sent by the software platform.

22. The apparatus of clause 21, wherein a host thread and an agent thread or agent process are executed on the software platform, and the event message receiving module comprises:
an event message sending submodule configured to send, by the software platform, the event message to the agent thread or agent process;
an event message forwarding submodule configured to forward, by the agent thread or agent process, the event message to the host thread;
a converting submodule configured to convert, by the host thread, the event message to an interrupt event; and
an interrupt event receiving submodule configured to receive the interrupt event sent by the host thread.

23. The apparatus of clause 22, wherein the event message sending submodule comprises:
a receiving unit configured to receive, by the software platform, information input by an external device; and
a converting unit configured to convert, by the software platform, the information to an event message and send the event message to the agent thread or agent process.

24. The apparatus of clause 21 or 22 or 23, further comprising:
a micro kernel event message sending module configured to send a micro kernel event message to the software platform.

25. The apparatus of clause 24, wherein the micro kernel event message sending module comprises:
a micro kernel event message sending submodule configured to send the micro kernel event message to the agent thread or agent process; and
a micro kernel event message forwarding submodule configured to forward, by the agent thread or agent process, the micro kernel event message to the software platform.

26. The apparatus of clause 15, wherein the software platform is a Linux platform.

27. The apparatus of clause 17, wherein the micro kernel control unit is a CPU register, and the control value is a register value.

28. The apparatus of clause 22, wherein the agent thread or agent process has a corresponding entity that comprises a network card or virtual network card.

29. A non-transitory computer readable storage medium storing a set of instructions that are executable by one or more processing devices to cause a computer to perform a micro kernel scheduling method comprising:
receiving a scheduling instruction for a current micro kernel; and
switching the current micro kernel to a target micro kernel.

30. The non-transitory computer readable storage medium of clause 29, wherein each micro kernel has a corresponding micro kernel control unit, each micro kernel control unit has a corresponding control value, and switching the current micro kernel to the target micro kernel comprises:
determining a first control value corresponding to the target micro kernel; and
replacing a second control value corresponding to the current micro kernel with the first control value corresponding to the target micro kernel.

31. The non-transitory computer readable storage medium of clause 29, wherein the scheduling instruction comprises an instruction for a setjmp function and a longjmp function, and receiving the scheduling instruction for the current micro kernel comprises:

receiving a scheduling instruction input by an external device; and
calling the setjmp function and the longjmp function according to the scheduling instruction.

The embodiments of this specification are all described in a progressive manner, each embodiment emphasizes a difference relative to other embodiments, and identical or similar parts in the embodiments may be obtained with reference to each other.

It is appreciated that some embodiments of this disclosure may be provided as a method, an apparatus, a system, or a computer program product. Therefore, some embodiments of this disclosure may be implemented as a complete hardware embodiment, a complete software embodiment, or an embodiment combining software and hardware. Moreover, some embodiments of this disclosure may be in the form of a computer program product implemented on one or more computer usable storage media (including, but not limited to, a magnetic disk memory, a CD-ROM, an optical memory, and the like, e.g., system memory 506 or NVM/storage device 508 of FIG. 5) including computer usable program codes.

In a typical configuration, the computer device includes one or more processors (CPU) (e.g., processor 502 of FIG. 5), an input/output interface (e.g., input/output device 510 of FIG. 5), a network interface (e.g., network interface 512 of FIG. 5), and a memory (e.g., system memory 506 or NVM/storage device 508 of FIG. 5). The memory may include a volatile memory, a random access memory (RAM) or a non-volatile memory or the like in a computer readable medium, for example, a read only memory (ROM) or a flash RAM. The memory is an example of the computer readable medium. The computer readable medium includes non-volatile and volatile media as well as removable and non-removable media and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition in this text, the computer readable medium does not include transitory media, such as modulated data signals and carriers.

Some embodiments of this disclosure are described with reference to flowcharts or block diagrams of the method, the terminal device, system and the computer program product according to some embodiments of this disclosure. It should be understood that a computer program instruction may be used to implement each process or block in the flowcharts or block diagrams and combinations of processes or blocks in the flowcharts or block diagrams. The computer program instructions may be provided to a computer (e.g., system 500 of FIG. 5), an embedded processor or a processor of another programmable data processing terminal device to generate a machine, such that the computer or the processor of another programmable data processing terminal device executes an instruction to generate an apparatus configured to implement functions designated in one or more processes in a flowchart or one or more blocks in a block diagram.

The computer program instructions may also be stored in a computer readable storage (e.g., system memory 506 or NVM/storage device 508 of FIG. 5) that can guide the computer or another programmable data processing terminal device to work in a specific manner, such that the instruction stored in the computer readable storage generates an article of manufacture including an instruction apparatus, and the instruction apparatus implements functions designated by one or more processes in a flowchart or one or more blocks in a block diagram.

The computer program instructions may also be loaded into the computer or another programmable data processing terminal device, such that a series of operation steps are executed on the computer or another programmable terminal device to generate a computer implemented processing, and therefore, the instruction executed in the computer or another programmable terminal device provides steps for implementing functions designated in one or more processes in a flowchart or one or more blocks in a block diagram.

Some embodiments of the embodiments of this disclosure have been described; however, once knowing basic creative concepts, those skilled in the art can make other variations and modifications to the embodiments. Therefore, the appended claims are intended to be explained as including the described embodiments and all variations and modifications falling within the scope of the embodiments of this disclosure.

As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

Finally, it should be further noted that in this text, the relation terms such as "first" and "second" are merely used to distinguish one entity or operation from another entity or operation, and do not require or imply that the entities or operations have this actual relation or order. Moreover, the terms "include," "comprise" or other variations thereof are intended to cover non-exclusive inclusion, so that a process, method, article or terminal device including a series of elements not only includes the elements, but also includes other elements not clearly listed, or further includes elements inherent to the process, method, article or terminal device. In the absence of more limitations, an element defined by "including a/an . . . " does not exclude that the process, method, article or terminal device including the element further has other identical elements.

A micro kernel scheduling method and a micro kernel scheduling apparatus provided in this disclosure are described in detail above, and the principles and implementation manners of this disclosure are described by applying specific examples in this text. The above descriptions on the embodiments are merely used to help understand the method of this disclosure and its core ideas. Meanwhile, for those of ordinary skill in the art, there may be modifications to the specific implementation manners and disclosure scopes according to the idea of this disclosure. Therefore, the content of the specification should not be construed as limitations to this disclosure.

What is claimed is:

1. A micro kernel scheduling method, applied to a software platform, the method comprising:
   receiving a scheduling instruction input by an external device to switch a current micro kernel to a target micro kernel that is executed in a host thread or a Kernel-based Virtual machine (KVM) that is executing on a software platform, wherein the current micro kernel and the target micro kernel are simplified version of a kernel of a real time operation system each having a corresponding micro kernel control unit of a CPU register and a corresponding control value of a register value;
   in response to the receiving, executing a setjmp function and a longjmp function according to the scheduling instruction, wherein a scope of the longjmp is within a scope of the setjmp, and the executing comprising:
      determining a first control value corresponding to the target micro kernel; and
      replacing a second control value corresponding to the current micro kernel with the first control value of a register value; and
   in response to executing the setjmp function and the longjmp function, switching the current micro kernel to a target micro kernel to execute in the host thread or the KVM on the software platform, wherein the current micro kernel after receiving the scheduling instruction executes the scheduling instruction to switch the current micro kernel to the target micro kernel independent of any communication of any micro kernels of the software platform to the host thread or the KVM of the software platform, wherein the software platform is a Linux platform.

2. The method of claim 1, further comprising:
   simulating software running with the target micro kernel.

3. The method of claim 1, further comprising:
   receiving an event message sent by the software platform; and
   wherein the host thread and one of an agent thread or agent process are executed on the software platform, and receiving the event message sent by the software platform comprises:
   sending, by the software platform, the event message to the agent thread or agent process;
   forwarding, by the agent thread or agent process, the event message to the host thread;
   converting, by the host thread, the event message to an interrupt event; and
   receiving the interrupt event sent by the host thread.

4. The method of claim 3, wherein sending, by the software platform, the event message to the agent thread or agent process comprises:
   receiving, by the software platform, information input by an external device;
   converting, by the software platform, the information to an event message; and
   sending, by the software platform, the event message to the agent thread or agent process.

5. The method of claim 3, further comprising:
   sending a micro kernel event message to the software platform.

6. The method of claim 5, wherein sending the micro kernel event message to the software platform comprises:
   sending the micro kernel event message to the agent thread or agent process; and
   forwarding, by the agent thread or agent process, the micro kernel event message to the software platform.

7. The method of claim 3, wherein the agent thread or agent process has a corresponding entity that comprises a network card or virtual network card.

8. A micro kernel scheduling apparatus, applied to a software platform, the apparatus comprising:
- a memory storing a set of instructions; and
- at least one processor configured to execute the set of instructions to cause the apparatus to perform:
  - receiving a scheduling instruction input by an external device to switch a current micro kernel to a target micro kernel that is executed in a host thread or a Kernel-based Virtual machine (KVM) that is executing on a software platform, wherein the current micro kernel and the target micro kernel are simplified version of a kernel of a real time operation system each having a corresponding micro kernel control unit of a CPU register and a corresponding control value of a register value;
  - in response to the receiving, executing a setjmp function and a longjmp function according to the scheduling instruction, wherein a scope of the longjmp is within a scope of the setjmp, and the executing comprising:
    - determining a first control value corresponding to the target micro kernel; and
    - replacing a second control value corresponding to the current micro kernel with the first control value of a register value; and
  - in response to executing the setjmp function and the longjmp function, switching the current micro kernel to a target micro kernel to execute in the host thread or the KVM on the software platform, wherein the current micro kernel after receiving the scheduling instruction executes the scheduling instruction to switch the current micro kernel to the target micro kernel independent of any communication of any micro kernels of the software platform to the host thread or the KVM of the software platform, wherein the software platform is a Linux platform.

9. The apparatus of claim 8, wherein the at least one processor is configured to execute the set of instructions to cause the apparatus to perform:
- simulating software running with the target micro kernel.

10. The apparatus of claim 8, wherein the at least one processor is configured to execute the set of instructions to cause the apparatus to perform:
- receiving an event message sent by the software platform.

11. A non-transitory computer readable storage medium storing a set of instructions that are executable by one or more processing devices to cause a computer to perform a micro kernel scheduling method comprising:
- receiving a scheduling instruction input by an external device to switch a current micro kernel to a target micro kernel that is executed in a host thread or a Kernel-based Virtual machine (KVM) that is executing on a software platform, wherein the current micro kernel and the target micro kernel are simplified version of a kernel of a real time operation system each having a corresponding micro kernel control unit of a CPU register and a corresponding control value of a register value;
- in response to the receiving, executing a setjmp function and a longjmp function according to the scheduling instruction, wherein a scope of the longjmp is within a scope of the setjmp, and the executing comprising:
  - determining a first control value corresponding to the target micro kernel; and
  - replacing a second control value corresponding to the current micro kernel with the first control value of a register value; and
- in response to executing the setjmp function and the longjmp function, switching the current micro kernel to a target micro kernel to execute in the host thread or the KVM on the software platform, wherein the current micro kernel after receiving the scheduling instruction executes the scheduling instruction to switch the current micro kernel to the target micro kernel independent of any communication of any micro kernels of the software platform to the host thread or the KVM of the software platform, wherein the software platform is a Linux platform.

\* \* \* \* \*